United States Patent
Tantot et al.

(10) Patent No.: US 9,745,051 B2
(45) Date of Patent: Aug. 29, 2017

(54) CONTROL DEVICE FOR AN ENGINE

(71) Applicant: SNECMA, Paris (FR)

(72) Inventors: Nicolas Jerome Jean Tantot, Paris (FR); Thierry Brichler, Paris (FR)

(73) Assignee: SNECMA, Paris (FR)

( * ) Notice: Subject to any disclaimer, the term of this patent is extended or adjusted under 35 U.S.C. 154(b) by 64 days.

(21) Appl. No.: 14/648,051

(22) PCT Filed: Nov. 15, 2013

(86) PCT No.: PCT/FR2013/052756
§ 371 (c)(1),
(2) Date: May 28, 2015

(87) PCT Pub. No.: WO2014/083259
PCT Pub. Date: Jun. 5, 2014

(65) Prior Publication Data
US 2015/0314853 A1    Nov. 5, 2015

(30) Foreign Application Priority Data
Nov. 30, 2012  (FR) ..................................... 12 61465

(51) Int. Cl.
*B64C 11/44* (2006.01)
*B64D 31/06* (2006.01)
*B64C 11/30* (2006.01)

(52) U.S. Cl.
CPC ............ *B64C 11/44* (2013.01); *B64C 11/305* (2013.01); *B64D 31/06* (2013.01); *Y02T 50/66* (2013.01)

(58) Field of Classification Search
CPC ........ B64C 11/44; B64C 11/305; B64D 31/06
See application file for complete search history.

(56) References Cited

U.S. PATENT DOCUMENTS 5,209,640 A      5/1993  Moriya
2014/0023499 A1* 1/2014  Collingbourne ...... B64C 11/305
                                            416/1

FOREIGN PATENT DOCUMENTS

DE       103 10 816        10/2004
DE    10 2007 028 143      12/2008
EP        0 436 231          7/1991
EP        2 505 494         10/2012

OTHER PUBLICATIONS

International Search Report Issued Feb. 24, 2014 in PCT/FR2013/052756 Filed Nov. 15, 2013.

* cited by examiner

*Primary Examiner* — Basil T Jos
(74) *Attorney, Agent, or Firm* — Oblon, McClelland, Maier & Neustadt, L.L.P.

(57) ABSTRACT

An engine control device having a calculator for calculating a pitch setpoint for at least one propeller of the engine, the calculator taking account at least of a flight speed.

10 Claims, 2 Drawing Sheets

CONTROL DEVICE FOR AN ENGINE

TECHNICAL FIELD AND PRIOR ART

The invention lies in the field of control devices for aviation turbine engines, which may have a single propeller or contra-rotating propellers.

The operation of the propeller(s) is conventionally controlled on the basis of two main modes of regulation.

Firstly there is regulation at constant speed of rotation, in which the pitch of the propeller, i.e. the setting angle of the propeller blades, is adjusted with the help of a servo-control loop so as to comply with a speed of rotation setpoint, with the real speed being measured by a dedicated sensor. This mode of regulation is used for all stages of flight during which forward speed is fast enough to obtain stable aerodynamic operation of the propeller.

Another known mode of regulation is at constant pitch, also known as beta mode. The pitch is servo-controlled to the throttle position given by the pilot and to the speed of rotation of the propeller. This mode is used during all stages in which the forward speed of the airplane is too slow for the aerodynamic characteristic of the propeller to present a sufficient traction response in the face of variation in the speed of rotation.

During a transition from one mode of regulation to another, it is desirable to minimize the variations in thrust that are to be observed at a given value of power transmitted by the shaft, since such variations are prejudicial to the pilot's perception that the engine is behaving properly. It is also desirable to limit variations in the speed of the propeller(s), because of the impact such variations have on the overall dynamics of the engine, and because of the vibration and noise that are emitted. It is also desirable to conserve continuity for the overall operation of the engine in all situations leading to a transition between operating modes, such as accelerating, decelerating, unexpected variations in the attitude of the airplane, or failures.

Unfortunately, the architecture of present regulation systems relies solely on measuring pitches and speeds of rotation of the propeller, and does not provide for any preventative action. Satisfying all of the requirements for continuity that are to be expected in the control of the engine can be achieved only that the price of degrading performance, in particular by selecting pitches that do not match the aerodynamics of the propeller but that are certain to ensure that operation is stable.

The transitions between the two modes of operation thus lead to difficulties in terms of regulating the engine, and these difficulties, which are already problematic on conventional turboprops with only one propeller, are made worse on engines having two propellers of the unducted (or "open rotor") fan type (or indeed on any engines having multiple propellers), since in such engines the behavior of the downstream rotor depends very strongly on the outlet conditions from the upstream rotor.

It is therefore desired to improve transitions from one mode of regulation to the other while complying with the above-mentioned constraints in terms of thrust variation, speed, and continuity of operation.

Research work undertaken by General Electric on behalf of NASA ("Extended parametric representation of compressor fans and turbines", 1984) or published in the Document SAE AIR 4065, has sought to identify conditions for minimizing losses or for expressing in simple manner the relationships between the invariants of a propeller. That work has not proposed a method for improving transitions between the two modes of operation.

DEFINITION OF THE INVENTION AND ASSOCIATED ADVANTAGES

In order to solve the above-mentioned difficulties, the invention provides an engine control device having calculation means for calculating a pitch setpoint for at least one propeller of the engine, the calculation means taking account at least of a flight speed.

By means of such a device, it is possible to perform predictive action and to improve the function of servo-controlling the pitch setpoint so as to enable it to comply with the specifications defined for the servo-control function during transitions from one mode of regulation to the other, while also complying with the above-mentioned constraints. Anticipatory regulation of pitch requirements is thus achieved and the above-mentioned drawbacks are limited, and in particular operating discontinuities and excursions away from thrust ranges and from speed ranges. The accuracy, the reaction time, and the stability of the local loop for controlling the pitch of the propeller(s) are all improved. The time required for convergence of the servo-control of the pitch is reduced.

Furthermore, for aircraft flying at higher speeds (e.g. at a flight Mach number greater than 0.5), the invention also makes it possible to improve the regulation of the pitch by taking account of the compressibility of the air in contact with the blades.

According to an advantageous characteristic, a magnitude representative of a behavior of the propeller(s) is determined using at least one polynomial, e.g. of second order. This enables the method to be performed in a computer of modest computation power. The use of a polynomial is a mathematical operation that is simple and easy to incorporate in a computer of limited computation power.

According to another advantageous characteristic, a magnitude representative of a behavior of the propeller is determined as a function of a relative Mach number for a blade of the propeller and an assumed pitch for the propeller.

Account is thus taken of the compression effects associated with speed in the transonic range for fast propellers such as advanced turboprop or unducted fan propellers.

In certain embodiments, numerical loss values calculated on the basis of extended loss models associated with the operation of the propeller(s) are determined. This characteristic makes it possible to extend the prediction of the behavior of the propeller(s) to the flight envelope, including to singular conditions.

In certain embodiments, an absorbed power coefficient is determined. Furthermore, in certain embodiments, the calculation means use a speed of rotation of the propeller(s). Furthermore, provision is also made for the calculation means to use a pitch assumption, and for them to use an iteration loop having a stop criterion that is convergence on a calculated value for shaft power.

The control device may be constituted by a module for a full authority digital engine control computer or it may be incorporated therein.

The invention also provides a full authority digital engine control computer that includes a device as mentioned above, and furthermore, it also provides a turboprop including a control device as mentioned above or an unducted fan engine including a control device as mentioned above.

DETAILED DESCRIPTION OF AN EMBODIMENT

Figure 1:
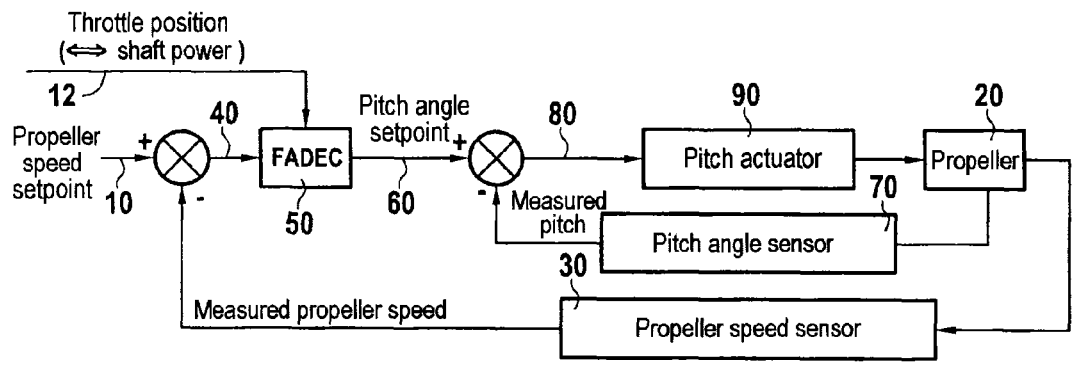
FIG. 1 shows a loop for servo-controlling the pitch of a turbine engine propeller, from which the invention has been developed.

FIG. 1 shows a loop for controlling the pitch of one or more propellers in order to regulate on a constant speed of rotation.

A setpoint 10 for the speed of the propeller 20 is given by the pilot or by an automatic or servo-controlled piloting system. A sensor 30 for sensing the speed of rotation of the propeller makes it possible to calculate the difference 40 between the setpoint and the instantaneous speed.

This difference 40 is transmitted to the full authority digital engine control (FADEC) 50 that uses a setpoint relating to the position of the engine throttle 12 and representative of the power delivered to the shaft, in order to determine a setpoint 60 for the pitch. This determination is performed by an iterative process on the basis of a list of predetermined pitch values selected as a function of the position of the throttle and without taking the speed of flight into account. The iterative process makes use of a model that takes the pitch and gives the power delivered to the shaft. The iterations are stopped when the calculated power corresponds to the requested power.

An angle sensor 70 for sensing the pitch makes it possible to calculate the difference between the instantaneous value of the pitch and the setpoint, and this is transmitted to the actuator 90 that acts on the pitch of the propeller 20.

The performance of the propeller(s) is represented by using conventional non-dimensional invariants, as described below.

$$\begin{cases} Ct = \dfrac{T}{\rho \cdot N^2 \cdot D^4} = f\left(J = \dfrac{v}{N \cdot D}, \beta\right) \\ Cp = \dfrac{PW}{\rho \cdot N^3 \cdot D^5} = g\left(J = \dfrac{v}{N \cdot D}, \beta\right) \end{cases}$$

Ct=traction coefficient
Cp=absorbed power coefficient
J=advance ratio
T=traction delivered by the propeller
PW=power available from the propeller shaft
N=speed of rotation of the propeller
D=diameter of the propeller
v=forward (or flying) speed of the airplane
β=propeller pitch.

For fast propellers, such as unducted fan or advanced turboprop propellers, a correction is added that depends on the flight Mach number in order to represent as well as possible the behavior of the propeller throughout the flight envelope.

Combining the invariants Ct, Cp, and J, also makes it possible to define the concept of propeller efficiency:

$$\eta = \dfrac{T \cdot v}{PW} = \dfrac{J \cdot Ct}{Cp}$$

Figure 2:
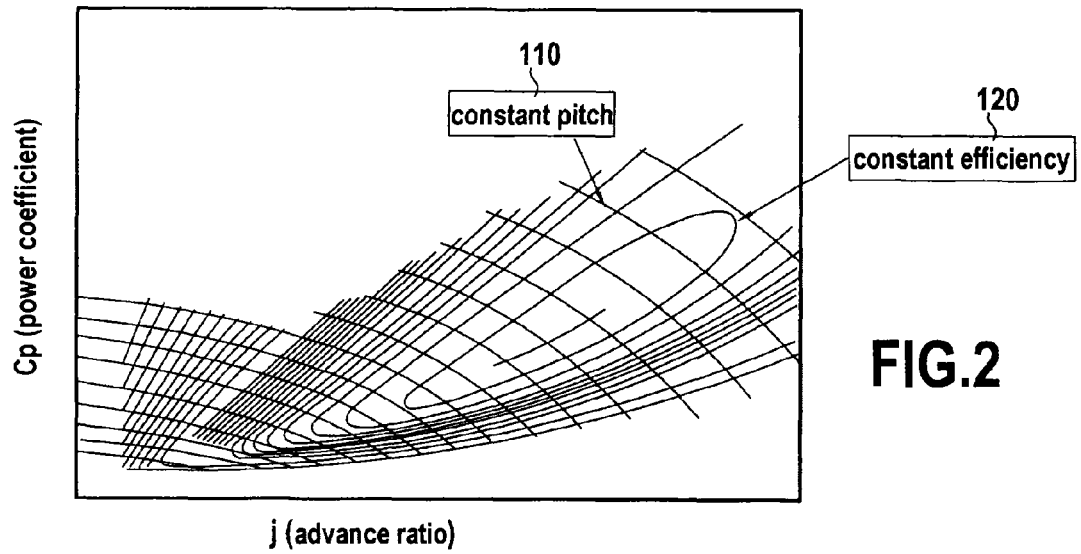
FIG. 2 is a chart from which it is possible to calculate performance coefficients of a propeller.

These coefficients are used in the form of a "propeller field" plotting variation in efficiency as a function of the advance ratio J and the absorbed power coefficient Cp, as shown in FIG. 2.

FIG. 2 shows the advance ratio J along the abscissa axis and the absorbed power coefficients Cp up the ordinate axis. These are determined knowing the efficiency η, for which the constant efficiency curves 100 are plotted, and knowing the setting angle for which constant pitch curves 110 are also plotted.

This chart presents drawbacks.

Firstly, it is useful to prepare a plurality of charts of this type for different Mach numbers seen by the blades of the propeller, and to interpolate the values obtained for J and Cp between the charts. Furthermore, because of the curves bunching together in the bottom left portion of the chart, accuracy is poor in this zone. In addition, it is difficult to generate these charts for extreme conditions, such as in the proximity of the airplane stalling, or at a strongly negative angle of incidence. Finally, at zero speed, efficiency is undetermined.

Figure 3:
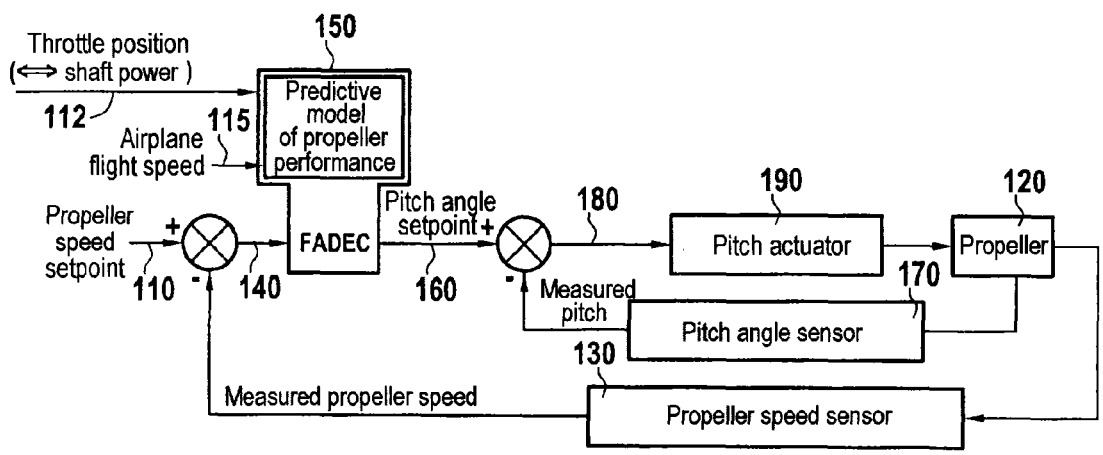
FIG. 3 shows an embodiment of the invention.

FIG. 3 shows the general principles of an embodiment of the invention. The elements are given numerical references that can be derived from those used in FIG. 1 by adding 100. Thus, the FADEC 150 (or a subsystem of the FADEC in charge of regulating the pitch of the propeller(s)) uses the difference 140 between the speed setpoint and the instantaneous speed of rotation of the propeller(s) to calculate a setpoint 160 for the pitch. In order to perform this calculation, the FADEC 150 also takes account of a setpoint relating to the position 112 of the throttle that represents the power delivered to the shaft, as in FIG. 1. However it also takes account of the flight speed of the airplane 115.

In the FADEC 150, in order to perform the above-mentioned calculation, use is made of a model of the performance of the propeller(s) based on predicting the losses associated with the operation of the propeller(s) (referred to below as Loss), and the absorbed power coefficient Cp, both of which are evaluated as a function of operating conditions, i.e. as a function of the airplane flight speed v 115 and of the speed(s) of rotation N of the propeller(s) as measured by the sensor 130 and evaluated as a function of an assumption for the pitch β. As in FIG. 1, this performance model is implemented iteratively within the FADEC 150 on the basis of successive refinements of the pitch assumption until convergence is obtained around the setpoint for shaft power.

The loss is defined as being the difference between the work obtained by the tractive force and the mechanical power delivered to the shaft, using the expression:

loss=PW−T·v=Cp−J·Ct

Compared with efficiency, loss has the advantage of being defined at all times and of being positive, regardless of the mode of operation of the propeller(s).

Figure 4:
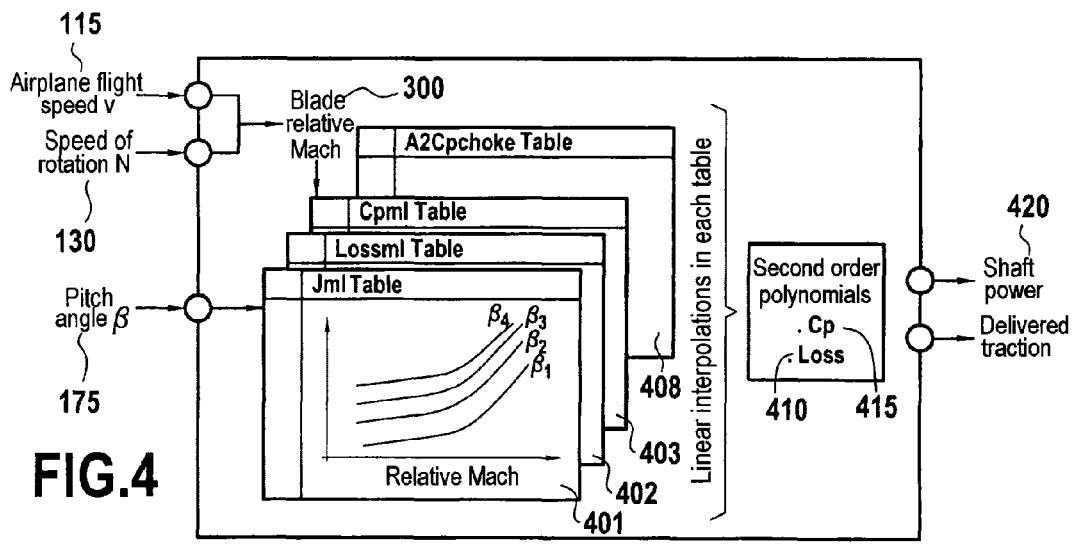
FIG. 4 shows a protocol implemented in an embodiment of the invention.

The diagram of FIG. 4 summarizes the architecture of the model. The prediction of these two magnitudes (loss and Cp) is performed by simple polynomial calculation with coefficients that are calculated as a function of the pitch β and of the relative Mach number 300 of the blades, which is itself a function of the airplane flight speed v 115 and of the speed(s) of rotation N of the propeller(s).

The input values v (reference 115, as measured), N (reference 130, as measured), and β (reference 175, assumption to be refined by iteration) are used in the presently-described implementation to determine eight numerical values, each of which is read from a corresponding predefined table. It is possible to envisage other implementations in the context of the invention, with other numbers of tables. The eight tables are shown in the figure under references 401 to 408. In each of these tables, the abscissa axis represents the relative Mach number of the blades, and the ordinate axis represents the numerical value to be read off. A plurality of curves corresponding to various pitch values β are present in each of the tables, and on each table, selecting the curve and the abscissa value gives a single numerical value to be read off. It is naturally possible to interpolate between values read from two curves that correspond to two values of β.

The eight numerical values read from the tables make it possible to determine numerical values for the two looked-for magnitudes, the loss 410 and the absorbed power coefficient (Cp) 415, while using second order polynomials. Determining these values makes it possible to deduce the shaft power 420 and the delivered traction, in the context of a model for predicting the aerodynamic behavior of the propeller. The iterative process is continued with a refined pitch value 175 until the calculated shaft power 420 corresponds to the setpoint 112.

The method thus relies on identifying an operating point at minimum loss, and on correlations that make it possible to define the difference between this point and optimum operation.

Figure 5:
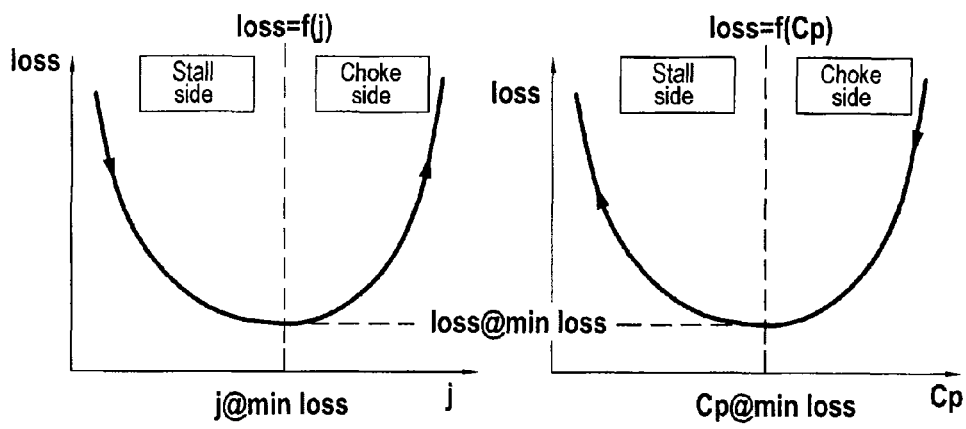
FIGS. 5 and 6 show particular aspects of the FIG. 4 protocol.

The loss correlations can be modeled in the form of two parabolic elements as shown in FIG. 5, one of them corresponding to positive angles of incidence ("stall side") and the other corresponding to negative angles of incidence ("choke side"). It is preferred to show this loss in the plane of the advance ratio J (on the left in FIG. 5).

A position parameter GH is introduced that is defined as follows:

$$GH = Jml - J$$

where Jml represents the advance ratio for minimum loss ("J minimum loss"). GH thus represents the difference between the advance ratio and operation at minimum loss.

The loss model is thus established by using the following equation:

$$\begin{cases} \text{Loss} = \text{Loss}_{ml} + \left\{ \dfrac{A2_{loss} \text{ choke}}{A2_{loss} \text{ stall}} \right\} \cdot GH^2 \\ GH = Jml - J \end{cases}$$

This model makes use of only four coefficients, for given blade pitch β and given Mach number relating to operation. These coefficients are as follows:
   Lossml: minimum loss;
   Jml: advance ratio corresponding to minimum losses;
   A2losschoke: parabolic curve of loss for negative angles of incidence; and
   A2lossstall: parabolic curve of loss for positive angles of incidence.

The absorbed power coefficient represents the aerodynamic performance of the blades, and is directly associated with the local angle of incidence of the blades.

The power coefficient varies in a manner that can be modeled simply, specifically in the form of the combination of a linear trend and two parabolic elements, one corresponding to positive angles of incidence ("stall side") and the other to negative angles of incidence ("choke side").

The model for the absorbed power coefficient Cp is thus established in the following form:

$$Cp = Cp_{ml} + A1 \cdot GH + \left\{ \dfrac{A2_{Cp} \text{ choke}}{A2_{Cp} \text{ stall}} \right\} \cdot GH^2$$

This model once more makes use of only four coefficients for given blade pitch β and given Mach number relating to operation. These coefficients are as follows:
   Cpml: absorbed power coefficient on the minimum loss line;
   A1: first order coefficient of the model for the absorbed power coefficient;
   A2Cpchoke: parabolic curve of the absorbed power coefficient for negative angles of incidence; and
   A2Cpstall: parabolic curve of the absorbed power coefficient for positive angles of incidence.

This analytical approach for the loss and for the absorbed power coefficient makes it possible not only to identify propeller performance that can be calculated by the usual predictive means (2D lift line aero codes, 3D Navier-Stokes) or by experimental means, but also to extend the prediction outside this range.

Figure 6:
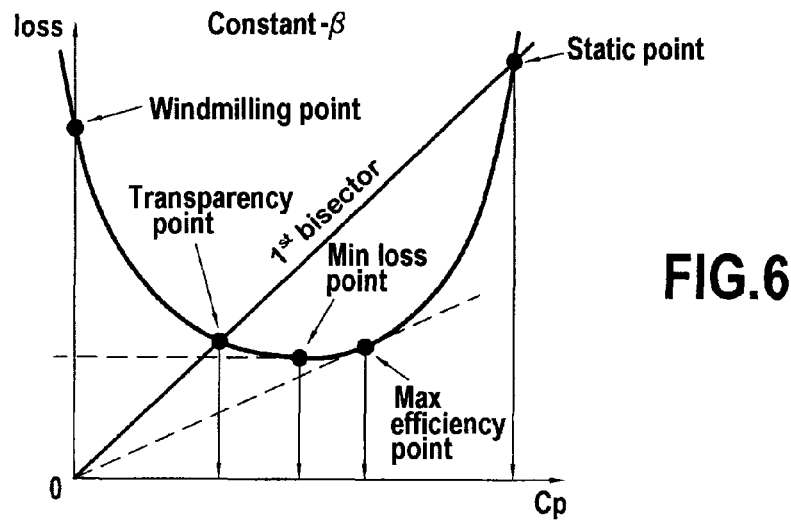

The operation of one or more propellers presents at least five characteristic points as shown in FIG. 6. These points are as follows:
   static point characterized by zero forward speed (J=0);
   maximum efficiency point;
   minimum loss point;
   transparency point: the beginning of operation in reverse mode (change of sign for the traction coefficient); and
   windmilling point: the beginning of operation in windmilling mode (drag being supplied without power being absorbed, Cp=0).

The above-described polynomial model enables the coordinates (in terms of losses and power coefficient) of each of these five characteristic points to be calculated analytically. In particular, the possibility of predicting the performance of the propeller(s) at the singular points, i.e. the static, transparency, and windmilling points, constitutes progress in the ability to represent the behavior of the propeller(s) over the entire operating range, from full throttle to idling, and for all external flying conditions.

The technical solution proposed herein presents the advantages: of being simple to implement digitally, being suitable for incorporating in a computer of modest computational power (a few linear interpolations to be performed in numerical arrays of small dimensions, a few analytic calculations on polynomials); of the prediction being robust because of the uniqueness of the solutions obtained; of mathematical accuracy that is identical regardless of the operating zone under consideration (including in the bottom left of the [J, Cp] chart); of simplifying and making reliable the way in which account is taken of the effects of compressibility by expressing the fundamental coefficients of the method as a function of the relative Mach number of the blades; and of extending the capacity for predicting the behavior of the propeller(s) to the entire flight envelope, including singular conditions (static condition, transparency point, feathering, . . . ), since the concept of loss on which the solution relies is always defined and positive.

The invention is not limited to the embodiments disclosed, but extends to any variant coming within the ambit of the scope of the claims.

The invention claimed is:

1. An engine control device, comprising:
a full authority digital engine control computer configured to calculate a pitch setpoint for at least one propeller of the engine using a propeller performance model that takes account at least of a flight speed in order to adapt a pitch setpoint while taking account of a shaft power setpoint, said propeller performance model being based on predicting losses associated with the operation of the propeller and an absorbed power coefficient.

2. A control device according to claim 1, wherein a magnitude representative of a behavior of the propeller is determined using at least one polynomial of second or higher order.

3. A control device according to claim 1, wherein a magnitude representative of a behavior of the propeller is determined as a function of a relative Mach number for a blade of the propeller and an assumed pitch for the propeller.

4. A control device according to claim 1, wherein a speed of rotation of the propeller is input into the propeller performance model.

5. A control device according to claim 1, wherein an assumption for a blade pitch is input into the propeller performance model.

6. A control device according to claim 1, wherein the propeller performance model is implemented using an iteration loop having a stop criterion that is a calculated value for shaft power converging on a shaft power setpoint.

7. A turboprop including a control device according to claim 1.

8. An unducted fan engine including a control device according to claim 1.

9. A control device according to claim 1, wherein the losses associated with the operation of the propeller is established using $$\begin{cases} \text{Loss} = \text{Loss}_{ml} + \left\{ \dfrac{A2_{loss}\text{choke}}{A2_{loss}\text{stall}} \right\} \cdot GH^2 \\ GH = Jml - J \end{cases},$$

in which J is an advance ratio, Jml is an advance ratio for minimum loss, $\text{Loss}_{ml}$ is a minimum loss, $A2_{loss}$choke is a parabolic curve of loss for negative angles of incidence, and $A2_{loss}$stall is a parabolic curve of loss for positive angles of incidence, Jml, $\text{Loss}_{ml}$, $A2_{loss}$choke, and $A2_{loss}$stall are coefficients determined based on a blade pitch, the flight speed, and a speed of rotation of the propeller.

10. A control device according to claim 9, wherein the absorbed power coefficient is established using $$Cp = Cp_{ml} + A1 \cdot GH + \left\{ \dfrac{A2_{Cp}\text{choke}}{A2_{Cp}\text{stall}} \right\} \cdot GH^2,$$

in which Cp is the absorbed power coefficient, $Cp_{ml}$ is an absorbed power coefficient on a minimum loss line, A1 is a first order coefficient of the model for the absorbed power coefficient, $A2_{cp}$choke is a parabolic curve of the absorbed power coefficient for negative angles of incidence, and $A2_{cp}$stall is a parabolic curve of the absorbed power coefficient for positive angles of incidence, and $Cp_{ml}$, A1, $A2_{cp}$choke, and $A2_{cp}$stall are coefficients determined based on the blade pitch, the flight speed, and the speed of rotation of the propeller.

* * * * *